United States Patent
Huang

(10) Patent No.: US 12,046,022 B2
(45) Date of Patent: Jul. 23, 2024

(54) MODEL TRAINING METHOD, CONTENT GENERATION METHOD, AND RELATED APPARATUSES

(71) Applicant: TENCENT TECHNOLOGY (SHENZHEN) COMPANY LIMITED, Shenzhen (CN)

(72) Inventor: Chao Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 226 days.

(21) Appl. No.: 17/585,677

(22) Filed: Jan. 27, 2022

(65) Prior Publication Data

US 2022/0148295 A1 May 12, 2022

Related U.S. Application Data

(63) Continuation of application No. PCT/CN2020/128245, filed on Nov. 12, 2020.

(30) Foreign Application Priority Data

Jan. 21, 2020 (CN) .......................... 202010073390.0

(51) Int. Cl.
*G06V 10/774* (2022.01)
*A63F 13/67* (2014.01)
(Continued)

(52) U.S. Cl.
CPC .......... *G06V 10/7747* (2022.01); *A63F 13/67* (2014.09); *G06V 10/764* (2022.01); *G06V 10/7715* (2022.01)

(58) Field of Classification Search
CPC ............. G06V 10/7747; G06V 10/764; G06V 10/7715; G06V 10/82; G06V 20/10;
(Continued)

(56) References Cited

U.S. PATENT DOCUMENTS

| 8,576,235 B1 | 11/2013 | Sumner et al. |
| 2019/0321727 A1 | 10/2019 | Rodgers |

(Continued)

FOREIGN PATENT DOCUMENTS

| CN | 109107161 | 1/2019 |
| CN | 110170171 | 8/2019 |

(Continued)

OTHER PUBLICATIONS

PCT International Search Report and Written Opinion issued in Application PCT/CN2020/128245 on Feb. 18, 2021, 16 pages.

(Continued)

*Primary Examiner* — Ronald Laneau
(74) *Attorney, Agent, or Firm* — ArentFox Schiff LLP

(57) ABSTRACT

A processing circuitry obtains a training set based on an interaction process of a plurality of cards. The training set includes a plurality of video frames, and a video frame includes a trigger region for triggering an action during the interaction process. The processing circuitry determines feature regions in the trigger region. A feature region includes a card and is set with an action label for indicating a first training content in the feature region. The processing circuitry also determines a feature vector based on the plurality of video frames. The feature vector indicates a triggering of the feature region. The processing circuit inputs the feature vector into a first model for training to obtain a second model. The first model associates the feature vector with the action label, and the second model is used for indicating a correspondence between a content of the card and the action label.

20 Claims, 8 Drawing Sheets

(51) Int. Cl.
*G06V 10/764* (2022.01)
*G06V 10/77* (2022.01)

(58) Field of Classification Search
CPC ...... A63F 13/67; A63F 13/2145; A63F 13/92; A63F 13/42; A63F 2300/6027; G06N 3/044; G06N 3/045; G06N 3/08; G06F 18/241
See application file for complete search history.

(56) References Cited

U.S. PATENT DOCUMENTS

| | | | |
|---|---|---|---|
| 2019/0356948 A1* | 11/2019 | Stojancic | H04N 21/8133 |
| 2023/0186634 A1* | 6/2023 | Wong | G06V 10/761 |
| | | | 382/159 |
| 2023/0334880 A1* | 10/2023 | Zong | G06V 30/19147 |

FOREIGN PATENT DOCUMENTS

| | | |
|---|---|---|
| CN | 110251942 | 9/2019 |
| CN | 110339569 | 10/2019 |
| CN | 111265881 | 6/2020 |
| EP | 1454663 A1 | 9/2004 |
| EP | 12030661 A2 | 3/2009 |
| WO | 2015164155 A1 | 10/2015 |

OTHER PUBLICATIONS

Supplementary European Office Action issued Sep. 27, 2022 in Application No. 20915388.1. (12 pages).
Jacek Mazurkiewicz: "Intelligent system for card game analysis and prediction", Jan. 1, 2018, pp. 1-8.
Yakovenko Nikolai et al: "Poker—CNN: A Pattern Learning Strategy for Making Draws and Bets in Poker Games Using Convolutional Networks", Proceedings of the AAAI Conference on Artificial Intelligence, vol. 30, No. 1, Jan. 1, 2016, pp. 1-8.
Martins Paulo et al: "Poker Vision: Playing Cards and Chips Identification Based on Image Processing", Jun. 8, 2011 (Jun. 8, 2011), SAT 2015 18th International Conference, Austin, TX, USA, Sep. 24-27, 2015; [Lecture Notes in Computer Science; Lect.Notes Computer], Springer, Berlin, Heidelberg, pp. 436-443.
Zuin Gianlucca et al: "Learning a Resource Scale for Collectible Card Games", 2019 IEEE Conference on Games (COG), IEEE, Aug. 20, 2019, pp. 1-8.
Liu Tianyu et al: "Playing Card-Based RTS Games with Deep Reinforcement Learning", Proceedings of the Twenty-Eighth International Joint Conference on Artificial Intelligence, Aug. 1, 2019 (Aug. 1, 2019), pp. 4540-4546.
Krists Zutis et al: "Who's Counting? Real-Time Blackjack Monitoring for Card Counting Detection", Oct. 13, 2009, pp. 1-10.
Supplementary European Office Action issued Oct. 14, 2022 in Application No. 20914246.2. (10 pages).

* cited by examiner

MODEL TRAINING METHOD, CONTENT GENERATION METHOD, AND RELATED APPARATUSES

RELATED APPLICATIONS

This application is a continuation of International Application No. PCT/CN2020/128245, entitled "MODEL TRAINING METHOD, CONTENT GENERATION METHOD, AND RELATED APPARATUSES" and filed on Nov. 12, 2020, which claims priority to Chinese Patent Application No. 202010073390.0, entitled "MODEL TRAINING METHOD, CONTENT GENERATION METHOD, AND RELATED APPARATUSES" filed on Jan. 21, 2020. The entire disclosures of the prior applications are hereby incorporated by reference in their entirety.

FIELD OF THE TECHNOLOGY

This disclosure relates to the field of computer technologies including model training and content generation.

BACKGROUND OF THE DISCLOSURE

With the development of technologies related to mobile terminals, more smart devices appear in people's daily life, where content interaction, for example, game content interaction, through a smart device is one of the main applications. To ensure content to be attractive to users, the content requires long-term and targeted update, which can be intelligently performed through artificial intelligence (AI).

Generally, the update may be based on a solution of AI imitation learning training for images, that is, a content image is used as the input of a deep network, and depth features of the image are extracted through a convolutional layer and a fully connected layer to train a related model, and targeted content is finally outputted through the trained model.

However, during imitation learning, there are many features in the content image, and there are also some interference content, that is, a part indicating no actual content, which easily causes over-fitting of model training, and puts some burden on the amount of training, affecting the model training efficiency and accuracy.

SUMMARY

In view of the previous description, embodiments of this disclosure provide a model training method, which can effectively avoid training interference due to the background of training content, so that the model training efficiency and accuracy are improved.

Some aspects of the disclosure provide a method for model training in an electronic device (e.g., terminal device, server device etc.) The method includes obtaining a training set based on an interaction process of a plurality of cards. The training set includes a plurality of video frames, and a video frame in the plurality of video frames includes a trigger region for triggering an action during the interaction process. The method also includes determining feature regions in the trigger region of the video frame. A feature region in the feature regions includes a card and is set with an action label for indicating a first training content in the feature region. The method also includes determining a feature vector based on the plurality of video frames. The feature vector indicates a triggering of the feature region. The method also includes inputting the feature vector into a first model for training to obtain a second model. The first model is used for associating the feature vector with the action label, and the second model is used for indicating a correspondence between a content of the card and the action label.

Some aspects of the disclosure provide an apparatus for model training. The apparatus includes processing circuitry configured to obtain a training set based on an interaction process of a plurality of cards. The training set includes a plurality of video frames, and a video frame in the plurality of video frames includes a trigger region for triggering an action during the interaction process. The processing circuitry is also configured to determine feature regions in the trigger region of the video frame. A feature region in the feature regions includes a card and is set with an action label for indicating a first training content in the feature region. The processing circuitry is also configured to determine a feature vector based on the plurality of video frames. The feature vector indicates a triggering of the feature region. The processing circuit is also configured to input the feature vector into a first model for training to obtain a second model. The first model is used for associating the feature vector with the action label, and the second model is used for indicating a correspondence between a content of the card and the action label.

Some aspects of the disclosure provide a non-transitory computer-readable medium storing instructions which when executed by a computer cause the computer to perform the method for model training.

It may be seen from the technical solutions above that, the embodiments of this disclosure have the following advantages:

A training set including a plurality of video frames is obtained, and a feature region in the video frames is determined, an action label for indicating training content being set in the feature region, and the feature region being smaller than an interface region of the video frames; then triggering of the feature region is counted to generate a feature vector; and the feature vector is further inputted into a first model for training to obtain a second model for indicating a correspondence between content of a target card and the action label. In this way, imitation learning training based on the feature region is implemented. Because the feature region is a part of video frames corresponding to a card image and includes no background part or another interference region, targeted model training is implemented, the amount of data processing in the model training is reduced, and the model training efficiency and accuracy are improved.

BRIEF DESCRIPTION OF THE DRAWINGS

To describe the technical solutions in embodiments of this disclosure or in the related art more clearly, the following briefly describes the accompanying drawings required for describing the embodiments or the related art. The accompanying drawings in the following descriptions show some embodiments of this disclosure.

DESCRIPTION OF EMBODIMENTS

Figure 1:
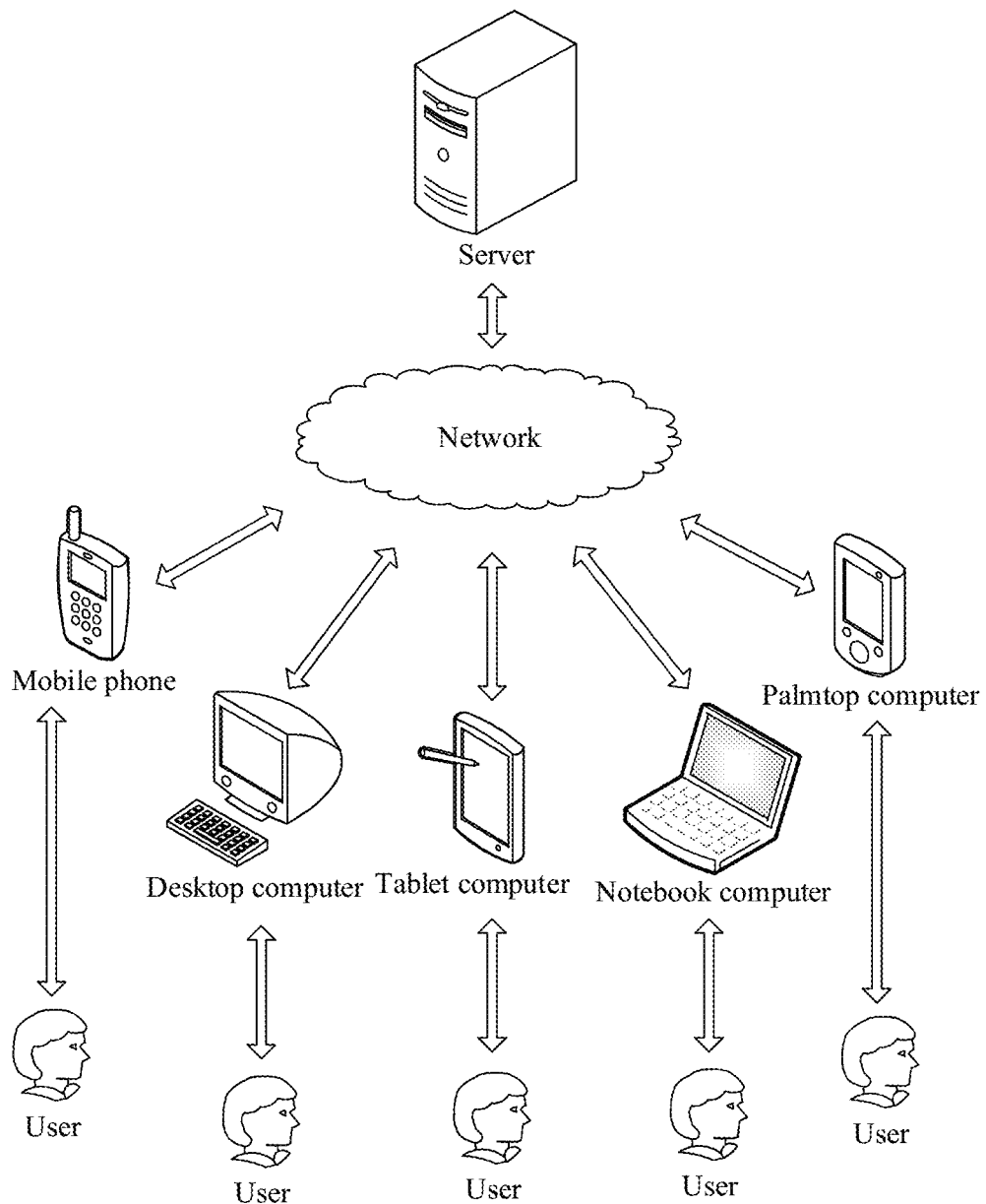
FIG. 1 is a network architecture diagram of a model training system in running.

The embodiments of this disclosure provide a model training method and a related apparatus, which may be applied to a system or a program including a model training function in a terminal device. A training set including a plurality of video frames is obtained, and a feature region in the video frames is determined, an action label for indicating training content being set in the feature region, and the feature region being smaller than an interface region of the video frames; then triggering of the feature region is counted to generate a feature vector; and the feature vector is further inputted into a first model for training to obtain a second model for indicating a correspondence between content of a target card and the action label. In this way, imitation learning training based on the feature region is implemented. Because the feature region is a part of video frames corresponding to a card image and includes no background part or another interference region, targeted model training is implemented, the amount of data processing in the model training is reduced, and the model training efficiency and accuracy are improved.

The terms such as "first", "second", "third", and "fourth" (if any) in the specification and claims of this disclosure and in the accompanying drawings are used for distinguishing between similar objects and not necessarily used for describing any particular order or sequence. It is to be understood that, data used in this way may be interchanged in an appropriate case, so that the embodiments of this disclosure described herein can be implemented in a sequence other than the sequence illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

First, some terms that may be used in the embodiments of this disclosure are described as follows:

Action label: a manually annotated action corresponding to a game screen, and the action corresponds to a running policy of the game.

Convolutional neural network (CNN) has a representation learning capability and can classify input information in a translation-invariant manner according to a hierarchical structure thereof.

Lightweight deep network: a small deep network with a small number of parameters and adapted to a CPU and an embedded device. In this embodiment, a first model is a preset lightweight deep network model; and a second model is a lightweight deep network model trained by a training set of content of cards, that is, the second model is obtained by adjusting parameters of the first model.

Depth feature: a feature finally extracted from an image by using a deep neural network, including abstract information of the image.

Long short-term memory (LSTM) network: a time recursive neural network, mainly used for resolving the problem of gradient disappearance and gradient explosion in a long sequence training process, to generate a feature vector based on a time sequence.

You only look once (YOLO): a target detection framework used for obtaining features of a target region. In this embodiment, a third model is a preset YOLO model; and a fourth model is a YOLO model trained by using a location correspondence between the content of the cards, that is, the fourth model is obtained by adjusting parameters of the third model.

Darknet53: a deep network including 53 convolutional layers.

Deep Q-learning (DQN) algorithm: a deep value learning algorithm.

It is to be understood that, the model training method provided by this disclosure may be applied to a system or a program including a model training function in a terminal device, such as a card game. For example, a model training system may be run on a network architecture shown in FIG. 1. FIG. 1 is a network architecture diagram of a model training system in running. It may be seen from the figure that, the model training system may provide model training with a plurality of information sources. The terminal device establishes a connection with a server through a network, then receives a plurality of pieces of content sent by the server, and displays corresponding content according to a policy of the terminal device itself. In addition, the server trains a related model by acquiring a training set uploaded by the terminal device, so that content generated is adapted to a target terminal device. It may be understood that, a plurality of terminal devices are shown in FIG. 1, but in an actual scenario, more or fewer types of terminal devices may be involved in a model training process, and the specific number and types depend on the actual scenario, which is not limited herein. In addition, one server is shown in FIG. 1, but in an actual scenario, especially a scenario in which a plurality of content applications interact with each other, a plurality of servers may be involved, and the specific number of servers depends on the actual scenario.

The model training method provided in this embodiment may also be performed offline, that is, without the involvement of the server. In this case, the terminal device is connected to another terminal device locally, and then performs a model training process, for example, a single-player game content simulation process, between the terminal devices.

It may be understood that, the model training system may be run on a personal mobile terminal, that is, the terminal device may be a mobile terminal. For example, a card game application may be run on a server, or in a third-party device to provide model training, to obtain a model training result of an information source. The specific model training system may be run on the foregoing devices as a program, or be run on the foregoing devices as a system component, or may be used as a type of cloud service program. The specific operation mode depends on an actual scenario, which is not limited herein.

With the development of technologies related to mobile terminals, more smart devices appear in people's daily life, where content interaction, for example, game content interaction, through a smart device is one of the main applications. To ensure content to be attractive to users, the content requires long-term and targeted update, which can be intelligently performed through artificial intelligence (AI).

Generally, the update may be based on a solution of AI imitation learning training for images, that is, a content image, for example, content of a card, is used as the input of a deep network, and depth features of the image are extracted through a convolutional layer and a fully connected layer to train a related model, and targeted content is finally outputted through the trained model.

However, during imitation learning, there are many features in the content image, and there are also some interference content, that is, a part indicating no actual content, which easily causes over-fitting of model training, and puts some burden on the amount of training, affecting the model training efficiency and accuracy.

Figure 2:
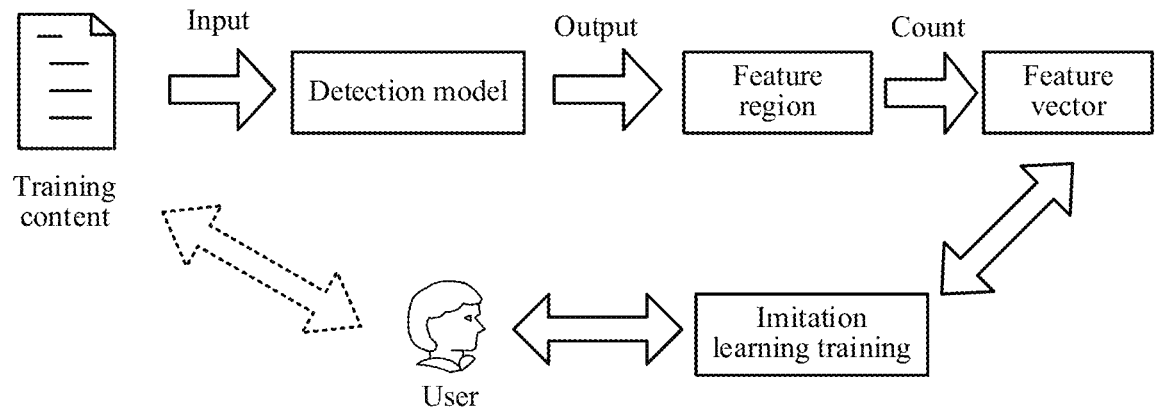
FIG. 2 is a process architecture diagram of model training according to an embodiment of this disclosure.

To resolve the foregoing problem, this disclosure provides a model training method, which is applied to a process architecture of model training shown in FIG. 2. FIG. 2 is a process architecture diagram of model training according to an embodiment of this disclosure. First, user-related content of cards or content of cards of a server database are acquired and used as training content to be inputted into a detection model, a feature region is detected, and triggering of the feature region is counted to obtain a feature vector. Then imitation learning training is performed based on the feature vector, and intelligent content generation is further performed based on the input of the user.

It may be understood that, the method provided by this disclosure may be writing of a program, which is used as a processing logic in a hardware system, or as a model training apparatus, to implement the processing logic in an integrated or externally connected manner. As an implementation, the model training apparatus obtains a training set including a plurality of video frames, and determines a feature region in the video frames, an action label for indicating training content being set in the feature region, and the feature region being smaller than an interface region of the video frames; then triggering of the feature region is counted to generate a feature vector; and the feature vector is further inputted into a first model for training to obtain a second model for indicating a correspondence between content of a target card and the action label. In this way, imitation learning training based on the feature region is implemented. Because the feature region is a part of video frames corresponding to a card image and includes no background part or another interference region, targeted model training is implemented, the amount of data processing in the model training is reduced, and the model training efficiency and accuracy are improved.

Figure 3:
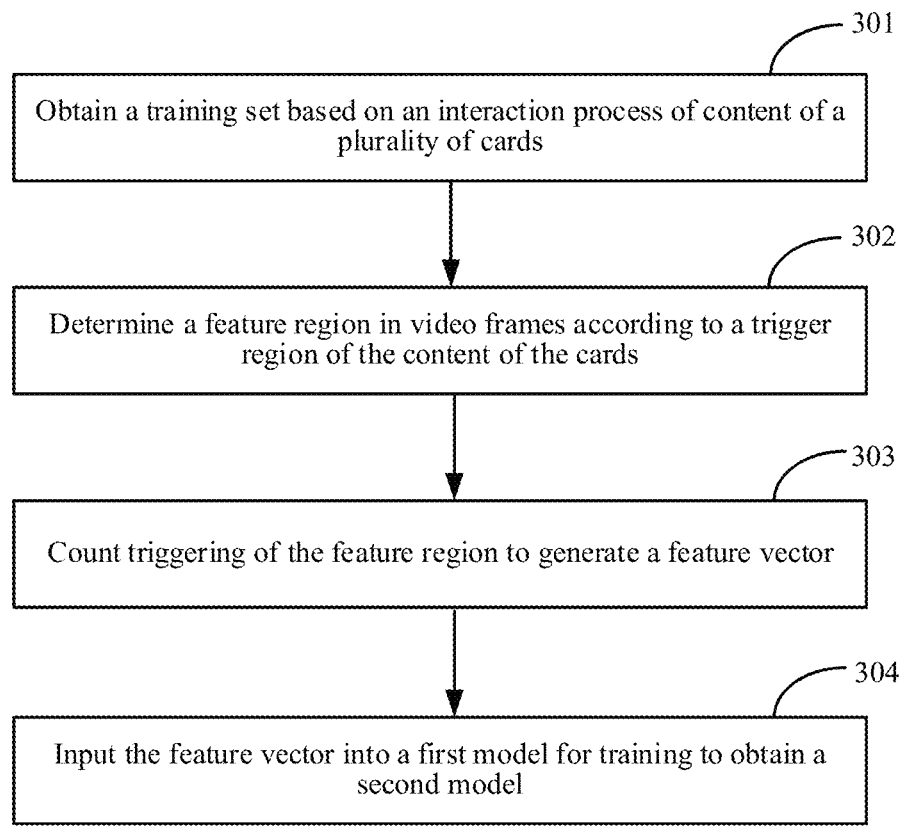
FIG. 3 is a flowchart of a model training method according to an embodiment of this disclosure.

With reference to the process architecture above, the model training method in this disclosure is described below. FIG. 3 is a flowchart of a model training method according to an embodiment of this disclosure. The method may be applied to a card game content generation process, and the method includes at least the following steps:

In step 301, a training set is obtained based on an interaction process of content of a plurality of cards.

In this embodiment, the interaction process based on the content of the plurality of cards may be displayed in a video form, that is, the training set includes a plurality of video frames. For example, the video frames may be a continuous video selected based on content of a target card, for example, a continuous video of a card game within one hour is selected.

In a possible implementation, the video frames may be extracted frame by frame, or may be obtained according to a certain sampling interval, which is considering that there may be a time interval in a content switching process, that is, adjacent video frames are combined according to a training sample interval to obtain a training set, for example, video frames within 1 second are combined and used as a sample in the training set.

In step 302, a feature region in video frames is determined according to a trigger region of the content of the cards.

In this embodiment, the feature region is a region determined based on the trigger region of the content of the cards, and the trigger region indicates that a user may select a card by triggering the region. Generally, the feature region may be the same as the trigger region, or may be reduced properly, for example: the border of a card is removed and used as the feature region. In addition, an action label for indicating training content is set in the feature region, and the feature region is smaller than an interface region of the video frames.

In a card game scenario, the action label is a logical action such as Strike and Dodge corresponding to each card or another button, and there is a logical connection between Dodge and Strike. The training content is the play order of the cards in the card game process, that is, the logic of the play of the cards.

Figure 4:
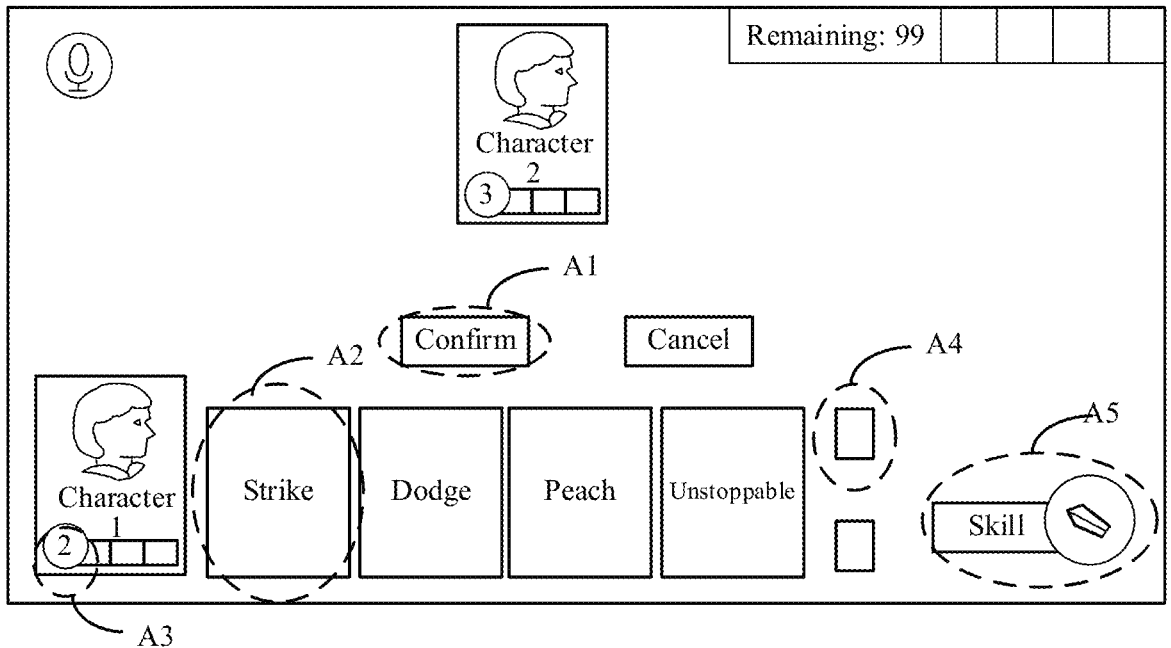
FIG. 4 is a schematic diagram of a model training scenario according to an embodiment of this disclosure.

In a possible scenario, FIG. 4 is a schematic diagram of a model training scenario according to an embodiment of this disclosure. The figure shows a confrontation scene of a card game. The figure includes a confirm key A1, a function card A2, a blood volume A3 of a character, an equipment card A4, and a skill card A5, which represent different feature regions. Each feature region corresponds to a represented logical process, where an action label indicated by the confirm key A1 is to confirm that a card is played; an action label indicated by the function card A2 is an interaction logic indicated by the content of the card; an action label of the blood volume A3 of the character is an end determining mark of the card game process, that is, the game is over in a case that the action label goes to zero; an action label of the equipment card A4 is an interaction parameter between battling users; and an action label of the skill card A5 is an interaction logic of an additional card.

In a possible implementation, a feature region determining process may be based on a preset setting, that is, a related feature region is marked in the video frames, and a related situation of the marking is directly counted during the training process. In addition, the feature region determining process may alternatively be based on an image feature for recognition, for example: an image feature with an image size of 10*10 in the video frames is recognized, and a corresponding feature region is determined; or a feature character such as Strike or Dodge in the image, is recognized, and a certain range is determined as the feature region based on the character. The specific determining method depends on an actual scenario.

303: Count triggering of the feature region to generate a feature vector.

In this embodiment, the triggering of the feature region refers to playing of cards corresponding to the feature region. The triggering may be implemented in different trigger manners, for example, by a slide operation, a click operation, or a voice control operation. The specific trigger manner depends on an actual scenario, which is not limited herein.

Figure 5:
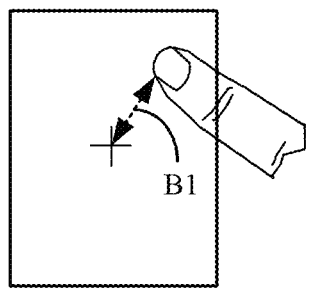
FIG. 5 is a schematic diagram of an operation trigger scenario according to an embodiment of this disclosure.

In a possible implementation, the triggering may be determined according to a distance between an operation trigger point and a center point of a related feature region. FIG. 5 is a schematic diagram of an operation trigger scenario according to an embodiment of this disclosure. The figure shows a distance B1 between an operation trigger point and a center point of a feature region. Whether the feature region is triggered may be determined by setting B1, for example: a trigger threshold is set to 20 cm. If the distance between the operation trigger point and the center point is less than 20 cm, the feature region is triggered.

Figure 6:
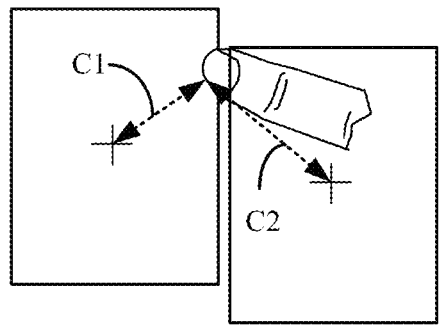
FIG. 6 is a schematic diagram of another operation trigger scenario according to an embodiment of this disclosure.

In addition, because there are a plurality of similar cards in a card game, a misoperation problem may exist in this case. FIG. 6 is a schematic diagram of another operation trigger scenario according to an embodiment of this disclosure. The figure shows a distance C1 between an operation trigger point and a center point of a first card and a distance C2 between the operation trigger point and a center point of a second card. By comparing C1 and C2, which card a trigger operation corresponds to may be determined and recorded. For example, if C1 is less than C2, the trigger operation corresponds to the first card and is triggered.

Figure 7:
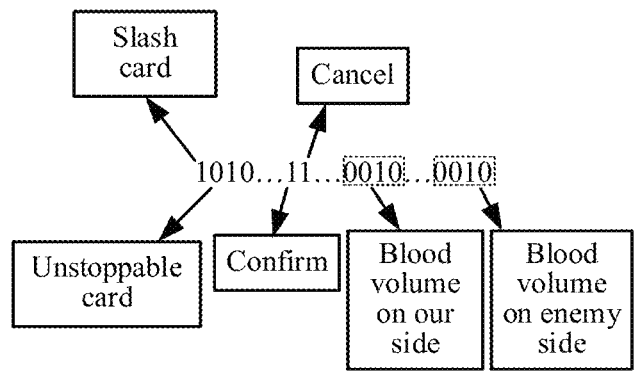
FIG. 7 is a schematic diagram of a feature sequence generation scenario according to an embodiment of this disclosure.

In this embodiment, a feature vector generation process may be performed based on the following process: Because there is a certain time series in the card playing corresponding to the triggering, triggering of a feature region in each video frame is counted respectively to generate a feature sequence, the feature sequence being a multi-dimensional binary sequence; and the feature vector is then generated according to the feature sequence. FIG. 7 is a schematic diagram of a feature sequence generation scenario according to an embodiment of this disclosure. The figure shows a digitization process of a card playing order, where a different meaning is assigned for each digit of the feature sequence for example, for the playing of a Strike card in the first digit of the sequence, and for the playing of an Unstoppable card in the third digit of the sequence. All types of cards that may appear in the cards are arranged and related operations are counted to obtain the feature sequence.

In a possible implementation, the card playing may be described in a binary manner, that is, 1 indicates that a card is played, and 0 indicates that a card is unplayed. For example, if the triggering in a feature region, is that the Strike card is played, the Dodge card is unplayed, and the Unstoppable card is played, the feature sequence is: "101". In addition, a digital expression manner may be adopted, that is, a plurality of position values are used as a group, and a feature is expressed according to the order of the occurrence of 1. For example: if a total blood volume on our side is 4, and currently is 3, the feature sequence is expressed as "0010". The specific feature expression manner depends on an actual scenario, which is not limited herein.

304: Input the feature vector into a first model for training to obtain a second model.

In this embodiment, the first model is used for associating the feature vector with the action label, and the second model is used for indicating a correspondence between content of a target card and the action label. The first model and the second model may be deep learning network models for imitation learning.

Figure 8:
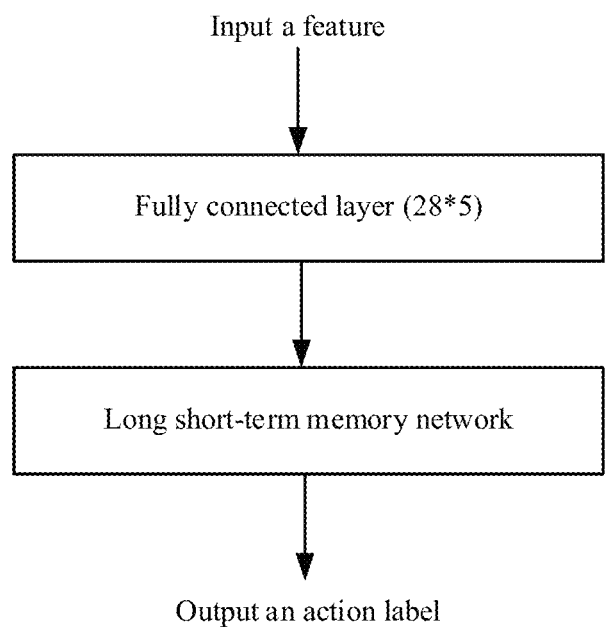
FIG. 8 is a model architecture diagram of model training according to an embodiment of this disclosure.

In a possible implementation, because there is a certain time series of card playing in a card game, further feature training needs to be performed on the time series of the feature vector. Therefore, for a model architecture of the first model, reference may be made to FIG. 8. FIG. 8 is a model architecture diagram of model training according to an embodiment of this disclosure. A time series feature of the feature vector is first determined; then the feature vector is inputted into the first model for parameter adjustment; and the time series feature is inputted into the first model after the parameter adjustment for training to obtain the second model. In addition, because the time series feature corresponds to the card playing order, the time series feature of a single feature vector may be excessively scattered. In this case, the feature vector may be segmented according to a feature extraction interval to obtain at least two feature vector sets; and then operation sequences corresponding to the same feature region in the at least two feature vector sets are extracted to obtain the time series feature. For example: feature learning is performed according to a feature vector of 5 consecutive frames.

In a scenario, the first model includes a fully connected layer and an LSTM layer. The fully connected layer is to learn depth features according to data features and learn the relationship between features in different dimensions, while the LSTM layer is to learn a time series feature in a card game. The input of a network is a feature vector corresponding to 5 frames of continuous images. The feature vector first extracts depth features thereof through the fully connected layer, then inputs the depth features into the LSTM layer, and outputs an action label, the action label representing a game behavior. The first model is to output game behaviors that are as consistent as possible with a player, that is, in the same game state, a game target clicked by AI is consistent with that of the player. In addition, because the number of operable targets may be 20, including 18 types of cards, and cancel and confirm keys; and the output of a corresponding model is 21, to which a behavior category of no action is added, and parameter adjustment is further performed, to obtain the second model.

With reference to the foregoing embodiments, a training set including a plurality of video frames is obtained, and a feature region in the video frames is determined, an action label for indicating training content being set in the feature region, and the feature region being smaller than an interface region of the video frames; then triggering of the feature region is counted to generate a feature vector; and the feature vector is further inputted into a first model for training to obtain a second model for indicating a correspondence between content of a target card and the action label. In this way, imitation learning training based on the feature region is implemented. Because the feature region is a part of video frames corresponding to a card image and includes no background part or another interference region, targeted model training is implemented, the amount of data processing in the model training is reduced, and the model training efficiency and accuracy are improved.

Figure 9:
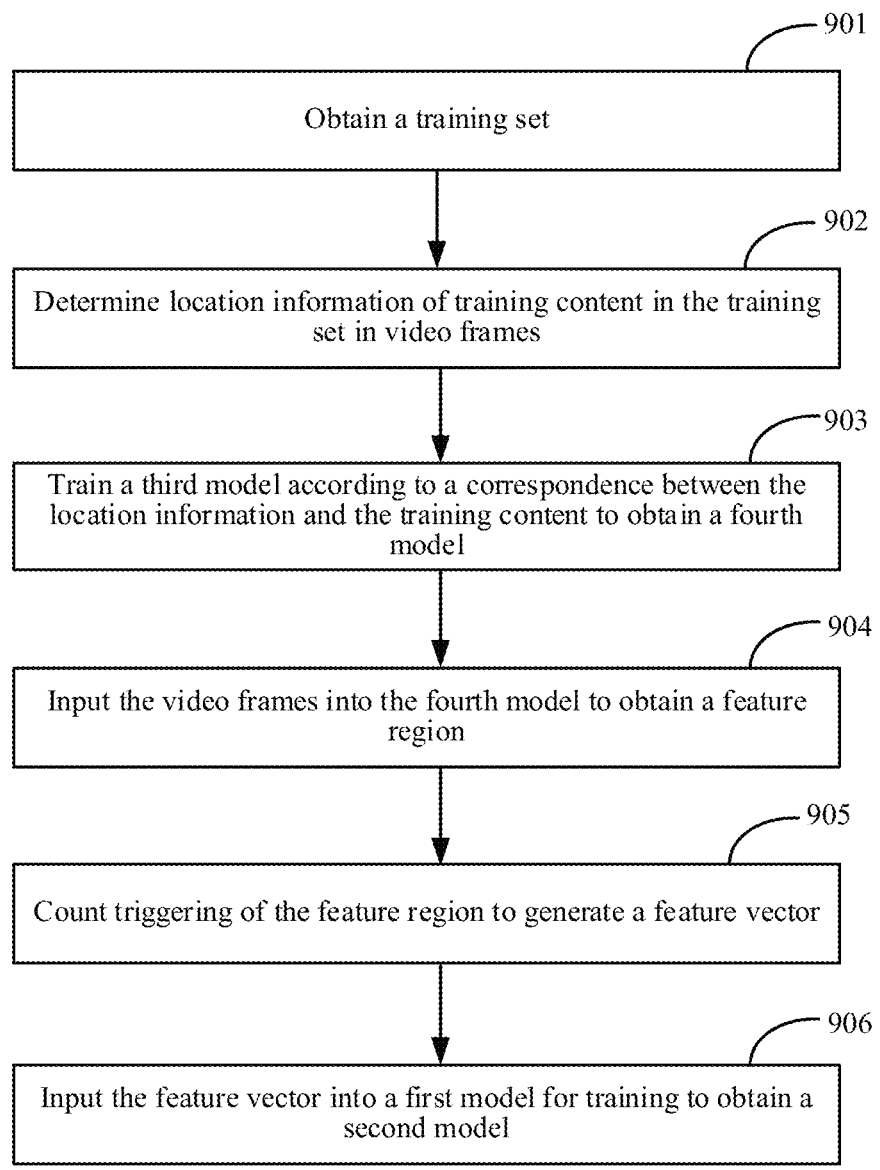
FIG. 9 is a flowchart of another model training method according to an embodiment of this disclosure.

The feature region determining process in the foregoing embodiments may alternatively be performed based on a model training detection method. The scenario is described below by using a card game application. FIG. 9 is a flowchart of another model training method according to an embodiment of this disclosure, and the method includes at least the following steps:

In step 901, a training set is obtained.

In this embodiment, step 901 is similar to step 301 in the embodiment of FIG. 3, and mutual reference may be made for related features, which are not repeated herein.

In step 902, location information of training content in the training set in video frames can be determined.

In this embodiment, the training content is a set of content of cards in current video frames, the location information of the training content in the video frames may be coordinates of a center point of the cards corresponding to the training content, coordinates of a corner point of the cards corresponding to the training content, or a coordinate position at which a center point and a corner point are combined.

In a possible implementation, because cards or related function keys may have different categories, and cards in the same category usually have a similar action label, shape information corresponding to the training content may be determined first; and then training content with similar shape information is filtered out to update the training content. For example: in a card game, 28 categories may be defined, including 18 types of cards, 4 types of equipment, and 4 types of blood volumes, and confirm and cancel keys. In addition, because the number of samples varies greatly between different categories, re-sampling may be performed to increase the number of a category with fewer samples in an iteration to ensure that the number of samples of each category exceeds 50.

In step 903, a third model is trained according to a correspondence between the location information and the training content to obtain a fourth model.

In this embodiment, the third model and the fourth model may adopt a yoloV3 model, and a yoloV3 network may be divided into a feature extraction part and a target detection part. To prevent over-fitting of the model, the feature extraction part adopts a darknet53 network pre-trained on a large data set ImageNet. The target detection part predicts a target location based on convolution features of three scales. In a case that the size of an input image is 416*416 pixels, the yoloV3 network divides the image into 13*13, 26*26, and 52*52 grids, and detects large-scale, medium-scale, and small-scale targets respectively. In a possible scenario, the large-scale targets correspond to card targets in the game, the medium-scale targets correspond to the confirm and cancel keys in the game, and the small-scale targets correspond to the blood volumes and equipment in the game.

In a possible implementation, after the classification according to the size information above, when the yoloV3 model is trained, the category cross entropy and the loss of the target location are fused as the loss function of the network and the model parameters are optimized through gradient backward pass. Specifically, using position prediction of a card as an example, the yoloV3 network first extracts features through the feature extraction part, and extracts convolution features based on the size of the 13*13 grid to predict the category and location of the card. The network outputs the category probability, x and y coordinates of an upper left corner of the location, and a width and height. The loss function fuses the category cross-entropy loss and the target position loss. Further, by minimizing the loss function, a corresponding gradient is calculated, and the model parameters are updated by the method of gradient backward pass to obtain the fourth model.

In step 904, the video frames are input into the fourth model to obtain a feature region.

In this embodiment, through the training process corresponding to the third model in step 903, the fourth model has a function of recognizing the feature region, thereby ensuring the detection accuracy of the feature region, that is, the detection accuracy of a card or a related function key.

In step 905, triggering of the feature region is counted to generate a feature vector.

In step 906, the feature vector is input into a first model for training to obtain a second model.

In this embodiment, step 905 and step 906 are similar to step 303 and step 304 in the embodiment of FIG. 3, and mutual reference may be made to related features, which are not repeated herein.

With reference to the foregoing embodiments, through the training of the third model, the accuracy of determining the feature region is improved, a precise recognition process of a related card and function key is ensured, an interference in a subsequent imitation learning process is further removed, and model training efficiency and accuracy are improved.

Figure 10:
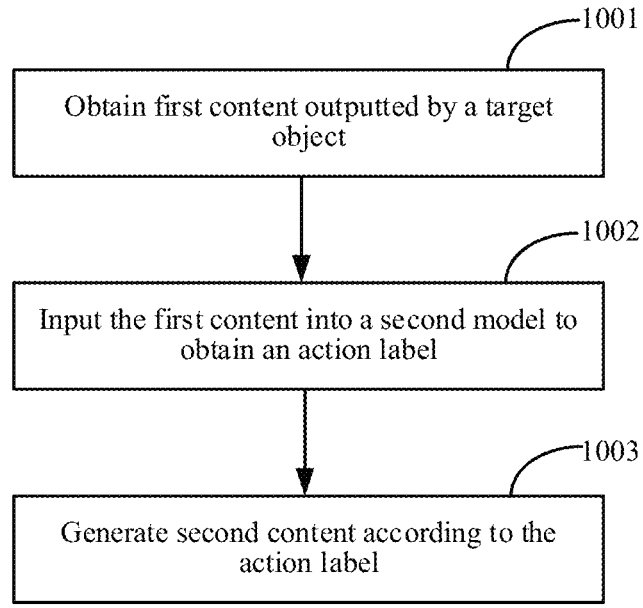
FIG. 10 is a flowchart of a content generation method according to an embodiment of this disclosure.

In the foregoing embodiments, the model training process is described. A game application is used as a specific scenario for description of a model application below. FIG. 10 is a flowchart of a content generation method according to an embodiment of this disclosure, and the method includes at least the following steps:

In step 1001, first content outputted by a target object is obtained.

In this embodiment, the target object may be a group of users in a specific program, for example: game users in a database of the game Hero Kill. The target object may alternatively be a single user, which is mainly applied to an automatic content generation process of a single-player game, that is, a terminal device acquires local operation data of the user and performs model training on AI of the corresponding game to implement an intellectual generation process of matching the content of the user. The target object may alternatively be a terminal device, that is, the content generation method provided by this disclosure is applied to a confrontation learning process. Through a large-scale battle between a plurality of terminal devices, a large amount of battle data is obtained to enrich the content of the database.

In addition, for example, if the target object is a game user in the database of the game Hero Kill, the first content may be historical battle data of the game user, and a continuous video of any length is selected as the training content.

In step 1002, the first content is input into a second model to obtain an action label.

In this embodiment, for the generation process of the second model, reference may be made to the embodiments of FIG. 3 and FIG. 9 above, which are not repeated herein.

In a possible scenario, the first content is a current operation of the user. By inputting the first content into the second model, a corresponding operation on the AI side is automatically generated. For example: if a player plays a Strike card, AI plays a Dodge card. It may be understood that, in an actual scenario, the corresponding process is a multi-step card playing process, which is merely an example herein.

In step 1003, second content is generated according to the action label.

In this embodiment, the second content is a card playing policy generated based on cards outputted by AI, and a content type of the second content depends on an actual scenario, which is not limited herein.

It may be seen from the foregoing embodiments that, through the training of the second model, AI can adaptively generate content of a target card of a related user, so that content generation efficiency and accuracy are improved, and user experience of a user in a content interaction process is further improved.

Figure 11:
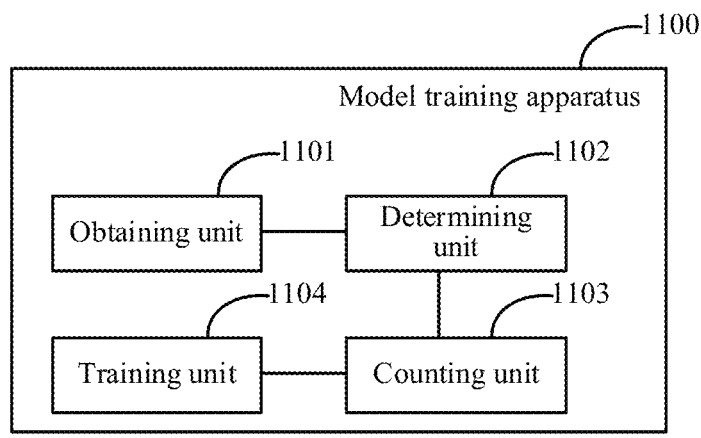
FIG. 11 is a schematic structural diagram of a model training apparatus according to an embodiment of this disclosure.

To better implement the foregoing solutions in the embodiments of this disclosure, related apparatuses for implementing the foregoing solutions are further provided below. FIG. 11 is a schematic structural diagram of a model training apparatus according to an embodiment of this disclosure. The model training apparatus 1100 includes an obtaining unit 1101, a determining unit 1102, a counting unit 1103 and a training unit 1104.

The obtaining unit 1101 is configured to obtain a training set based on an interaction process of content of a plurality of cards, the training set including a plurality of video frames, and the video frames includes a trigger region of the content of the cards;

The determining unit 1102 is configured to determine a feature region in the video frames according to the trigger region of the content of the cards, an action label for indicating training content is set in the feature region, the action label is determined based on the content of the cards, and the feature region is smaller than an interface region of the video frames.

The counting unit 1103 is configured to count triggering of the feature region to generate a feature vector.

The training unit 1104 is configured to input the feature vector into a first model for training to obtain a second model, the first model being used for associating the feature vector with the action label, and the second model being used for indicating a correspondence between content of a target card and the action label.

In some possible implementations of this disclosure, the determining unit 1102 is specifically configured to determine location information of the training content in the video frames according to the trigger region of the content of the cards.

The determining unit 1102 is specifically configured to train a third model according to a correspondence between the location information and the training content to obtain a fourth model, the third model is used for associating the location information with the training content, and the fourth model is used for indicating a correspondence between the video frames and the feature region.

The determining unit 1102 is specifically configured to input the video frames into the fourth model to obtain the feature region.

In some possible implementations of this disclosure, the determining unit 1102 is further configured to determine shape information corresponding to the training content.

The determining unit 1102 is further configured to filter out training content with similar shape information to update the training content.

In some possible implementations of this disclosure, the determining unit 1102 is specifically configured to classify the training content according to the shape information to obtain at least two categories of training content.

The determining unit 1102 is specifically configured to determine first gradient information according to the at least two categories of training content.

The determining unit 1102 is specifically configured to determine second gradient information according to the location information.

The determining unit 1102 is specifically configured to train parameters of the third model by minimizing the first gradient information and the second gradient information to obtain a fourth model.

In some possible implementations of this disclosure, the counting unit 1103 is specifically configured to count triggering of the feature region in each video frame respectively to generate a feature sequence, the feature sequence being a multi-dimensional binary sequence.

The counting unit 1103 is specifically configured to generate the feature vector according to the feature sequence.

In some possible implementations of this disclosure, the counting unit 1103 is specifically configured to obtain a center point of the feature region.

The counting unit 1103 is specifically configured to determine the triggering according to a distance between the center point and an operation trigger point to generate the feature sequence.

In some possible implementations of this disclosure, the training unit 1104 is specifically configured to determine a time series feature of the feature vector.

The training unit 1104 is specifically configured to input the feature vector into the first model for parameter adjustment.

The training unit 1104 is specifically configured to input the time series feature into the first model after the parameter adjustment for training to obtain the second model.

In some possible implementations of this disclosure, the training unit 1104 is specifically configured to segment the feature vector according to a feature extraction interval to obtain at least two feature vector sets.

The training unit 1104 is specifically configured to extract operation sequences corresponding to the same feature region in the at least two feature vector sets to obtain the time series feature.

In some possible implementations of this disclosure, the obtaining unit 1101 is specifically configured to obtain level information of the interaction process of the content of the plurality of cards, the level information is used for indicating complexity of the interaction process.

The obtaining unit 1101 is specifically configured to extract a first card game and a second card game according to the level information, level information of the first card game is different from that of the second card game.

The obtaining unit 1101 is specifically configured to determine the training set according to the first card game and the second card game.

A training set including a plurality of video frames is obtained, and a feature region in the video frames is determined, an action label for indicating training content being set in the feature region, and the feature region being smaller than an interface region of the video frames; then triggering of the feature region is counted to generate a feature vector; and the feature vector is further inputted into a first model for training to obtain a second model for indicating a correspondence between content of a target card and the action label. In this way, imitation learning training based on a feature region is implemented. Because the feature region is a part of video frames corresponding to an image and includes no background part or another interference region, targeted model training is implemented, the amount of data processing in the model training is reduced, and the model training efficiency and accuracy are improved.

Figure 12:
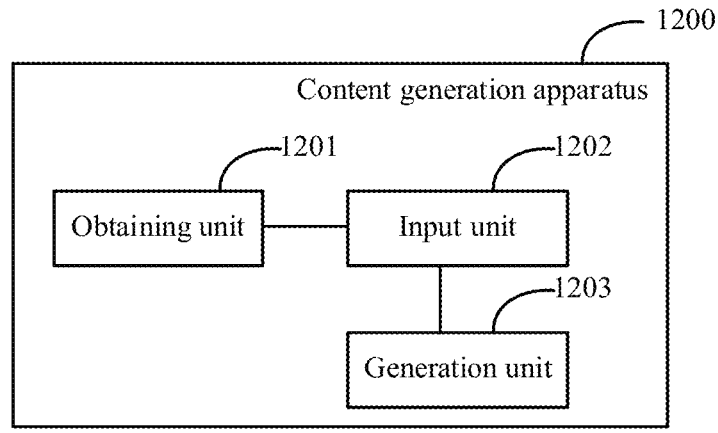
FIG. 12 is a schematic structural diagram of a content generation apparatus according to an embodiment of this disclosure.

A third aspect of this disclosure provides a content generation apparatus 1200. FIG. 12 is a schematic structural diagram of a content generation apparatus according to an embodiment of this disclosure. The apparatus includes: an obtaining unit 1201, an input unit 1202 and a generation unit 1203. The obtaining unit 1201 is configured to obtain first content outputted by a target object.

The input unit 1202 is configured to input the first content into a second model to obtain an action label, the second model being obtained through training based on the model training method according to the first aspect or any one of the first aspect.

The generation unit 1203 is configured to generate second content according to the action label.

It is noted that one or more modules, submodules, and/or units in the present disclosure can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 13:
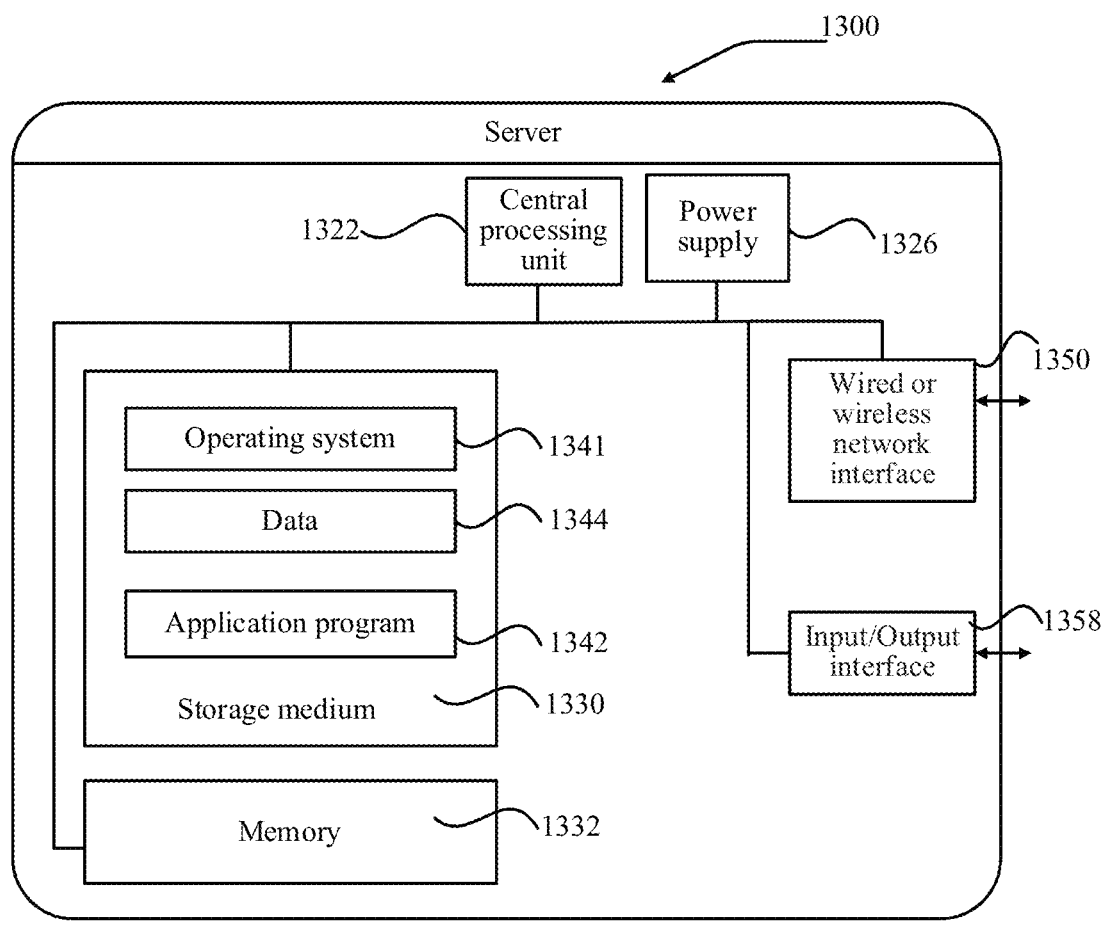
FIG. 13 is a schematic structural diagram of a server according to an embodiment of this disclosure.

The embodiments of this disclosure further provide a server. FIG. 13 is a schematic structural diagram of a server according to an embodiment of this disclosure. The server 1300 may vary greatly due to different configurations or performance, and may include one or more central processing units (CPUs) 1322 (for example, one or more processors) and a memory 1332, and one or more storage media 1330 that store application programs 1342 or data 1344 (for example, one or more mass storage devices). The memory 1332 and the storage media 1330 may be transient storage or persistent storage. A program stored in the storage medium 1330 may include one or more modules (not shown in the figure), and each module may include a series of instruction operations on the server. Further, the CPU 1322 may be configured to communicate with the storage medium 1330, and perform, on the server 1300, the series of instruction operations in the storage medium 1330.

The server 1300 may further include one or more power supplies 1326, one or more wired or wireless network interfaces 1350, one or more input/output interfaces 1358, and/or one or more operating systems 1341 such as Windows Server™, Mac OS X™, Unix™, Linux™, and FreeBSD™.

The steps performed by the model training apparatus in the foregoing embodiment may be based on the server structure shown in FIG. 13.

Figure 14:
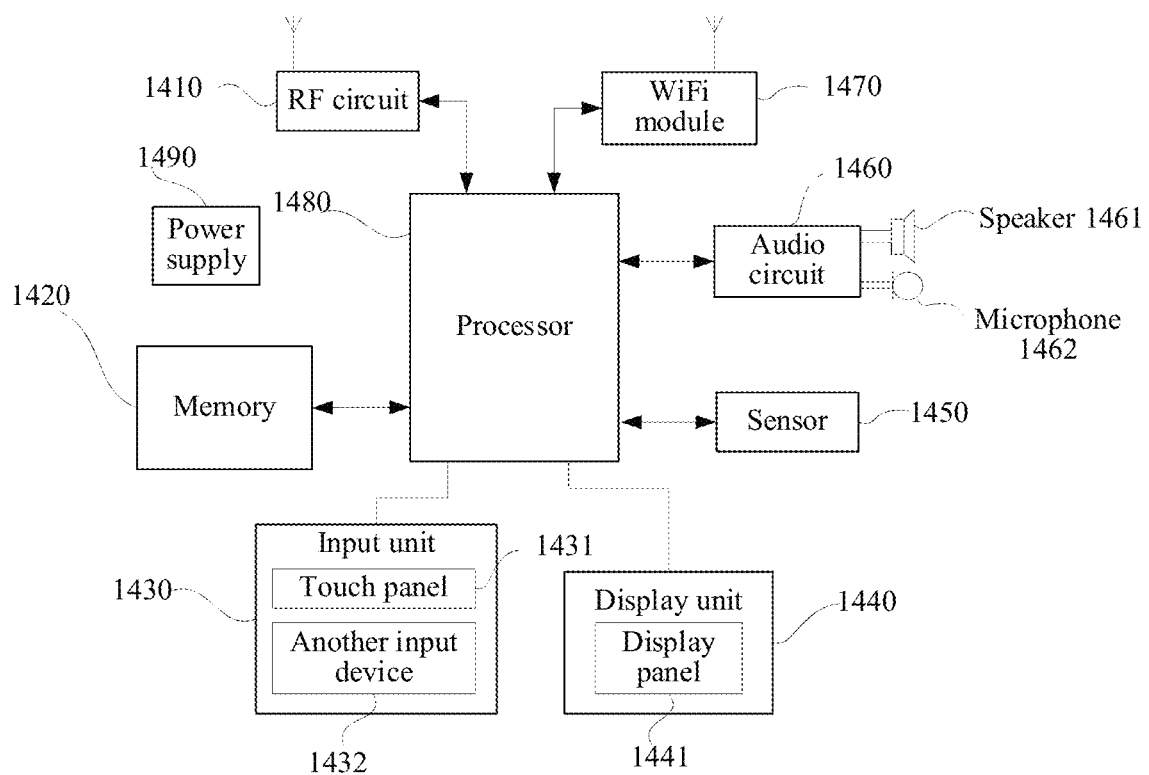
FIG. 14 is a schematic structural diagram of a terminal device according to an embodiment of this disclosure.

The embodiments of this disclosure further provide a terminal device. FIG. 14 is a schematic structural diagram of another terminal device according to an embodiment of this disclosure. For ease of description, only parts related to the embodiments of this disclosure are shown. For specific technical details that are not disclosed, refer to the method part in the embodiments of this disclosure. The terminal may be any terminal device including a mobile phone, a tablet computer, a personal digital assistant (PDA), a point of sales (POS), and an on-board computer, and the terminal device being a mobile phone is used as an example.

FIG. 14 is a block diagram of a structure of a part of a mobile phone related to a terminal according to an embodiment of this disclosure. Referring to FIG. 14, the mobile phone includes components such as: a radio frequency (RF) circuit 1410, a memory 1420, an input unit 1430, a display unit 1440, a sensor 1450, an audio circuit 1460, a wireless fidelity (Wi-Fi) module 1470, a processor 1480, and a power supply 1490. The input unit 1430 may include a touch panel 1431 and another input device 1432, the display unit 1440 may include a display panel 1441, and the audio circuit 1460 may include a speaker 1461 and a microphone 1462. A person skilled in the art can understand that the structure of the mobile phone shown in FIG. 14 does not constitute a limitation on the mobile phone, and the mobile phone may include more or fewer components than those shown in the figure, or some components may be combined, or a different component deployment may be used.

The processor 1480 is a control center of the mobile phone, and is connected to various parts of the entire mobile phone through various interfaces and lines. By running or executing a software program and/or module stored in the memory 1420, and invoking data stored in the memory 1420, the processor performs various functions of the mobile phone and performs data processing, so that the entire mobile phone is monitored. In some examples, the processor 1480 may include one or more processing units. In some examples, the processor 1480 may integrate an application processor and a modem processor, where the application processor mainly processes an operating system, a user interface, an application program, and the like, and the modem processor mainly processes wireless communications. It may be understood that the modem may either not be integrated into the processor 1480.

Although not shown in the figure, the mobile phone may further include a camera, a Bluetooth module, and the like, which is not repeated herein.

In the embodiments of this disclosure, the processor 1480 included in the terminal device further has functions of performing the steps of the model training method above.

The embodiments of this disclosure further provide a computer-readable storage medium, storing model training instructions, the model training instructions, when run on a computer, causing the computer to perform the steps performed by the model training apparatus in the foregoing method described in the embodiments of FIG. 2 to FIG. 10.

The embodiments of this disclosure further provide a computer program product including model training instructions, the computer program product, when run on a computer, causing the computer to perform the steps performed by the model training apparatus in the foregoing method described in the embodiments of FIG. 2 to FIG. 10.

The embodiments of this disclosure further provide a model training system. The model training system may include the model training apparatus described in the embodiment of FIG. 11 or the content generation apparatus in FIG. 12.

A person skilled in the art can clearly understand that for convenience and conciseness of description, for specific working processes of the foregoing systems, devices and units, reference may be made to the corresponding processes in the foregoing method embodiments, which are not repeated herein.

In the several embodiments provided in this disclosure, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of this disclosure may be integrated into one processing unit, or each of the units may exist alone physically, or two or more units are integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure may be implemented in the form of a software product. The computer software product is stored in a storage medium and includes several instructions for instructing a computer device (which may be a personal computer, a model training apparatus, a network device, or the like) to perform all or some of the steps of the methods described in the embodiments of this disclosure. The foregoing storage medium includes: any medium that can store a program code, such as a USB flash drive, a removable hard disk, a random-only memory (ROM), a random access memory (RAM), a magnetic disk, or an optical disc.

The foregoing embodiments are merely intended for describing the technical solutions of this disclosure, but not for limiting this disclosure. Although this disclosure is described in detail with reference to the foregoing embodiments, it is to be understood by a person of ordinary skill in the art that modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions of the embodiments of this disclosure.

What is claimed is:

1. A method for model training in an electronic device, comprising:
   obtaining a training set based on an interaction process of a plurality of cards in a game, the training set comprising a plurality of video frames, and a video frame in the plurality of video frames comprising a card selection region for triggering an action during the interaction process;
   determining feature regions in the card selection region of the video frame, each feature region in the feature regions including a respective card and being set with an action label, the action label indicating a game action associated with the respective feature region;
   determining a feature vector based on selections of feature regions in the plurality of video frames; and
   inputting the feature vector into a first model for training to obtain a second model, the first model associating the feature vector with action labels of the feature regions, and the second model indicating correspondences between content of the plurality of cards and the action labels.

2. The method according to claim 1, wherein the determining the feature regions comprises:
   determining first location information of first training content in the video frame indicated by the action labels;
   training a third model according to a correspondence between the first location information and the first training content to obtain a fourth model, the third model associating the first location information with the first training content, and the fourth model determining the feature regions from the video frame; and
   inputting the video frame into the fourth model to obtain the feature regions.

3. The method according to claim 2, further comprising:
   determining first shape information corresponding to the first training content; and
   filtering out the first training content with the first shape information being in a same category as second shape information of a second training content.

4. The method according to claim 3, wherein the training the third model comprises:
   classifying training contents obtained from the training set according to shape information of the training contents to obtain at least two categories of the training contents;
   determining first gradient information according to the at least two categories of the training contents;
   determining second gradient information according to location information of the training contents; and
   training parameters of the third model by minimizing the first gradient information and the second gradient information to obtain the fourth model.

5. The method according to claim 1, wherein the determining the feature vector comprises:
   generating a feature sequence based on a detection of the selections of the feature regions, the feature sequence being a multi-dimensional binary sequence; and
   generating the feature vector according to the feature sequence.

6. The method according to claim 5, wherein the generating the feature sequence comprises:
   determining a center point of a feature region of the feature regions; and
   detecting the selection of the feature region according to a distance between the center point and an operation trigger point.

7. The method according to claim 1, wherein the inputting the feature vector into the first model for training to obtain the second model comprises:
   determining a time series feature of the feature vector;
   inputting the feature vector into the first model for a parameter adjustment of the first model; and
   inputting the time series feature into the first model after the parameter adjustment for training to obtain the second model.

8. The method according to claim 7, wherein the determining the time series feature of the feature vector comprises:
   segmenting the feature vector according to a feature extraction interval to obtain at least two feature vector sets; and
   extracting operation sequences on the feature region in the at least two feature vector sets to obtain the time series feature.

9. The method according to claim 1, wherein the interaction process of the plurality of cards is a first interaction process of the plurality of cards, the obtaining the training set comprises:

determining first level information of the first interaction process of the plurality of cards, the first level information indicating a first complexity;

determining second level information of a second interaction process of the plurality of cards, the second level information indicating a second complexity that is different from the first complexity; and determining the training set from the first interaction process of the plurality of cards and the second interaction process of the plurality of cards.

10. The method according to claim 1, wherein the first model and the second model are deep network models used in a card game.

11. An apparatus comprising processing circuitry configured to:

obtain a training set based on an interaction process of a plurality of cards in a game, the training set comprising a plurality of video frames, and a video frame in the plurality of video frames comprising a card selection region for triggering an action during the interaction process;

determine feature regions in the card selection region of the video frame, each feature region in the feature regions including a respective card and being set with an action label, the action label indicating a game action associated with the respective feature region;

determine a feature vector based on selections of feature regions in the plurality of video frames; and input the feature vector into a first model for training to obtain a second model, the first model being configured to associate the feature vector with action labels of the feature regions, and the second model being configured to indicate correspondences between content of the plurality of card and the action labels.

12. The apparatus according to claim 11, wherein the processing circuitry is configured to:

determine first location information of first training content in the video frame indicated by the action labels;

train a third model according to a correspondence between the first location information and the first training content to obtain a fourth model, the third model being configured to associate the first location information with the first training content, and the fourth model being configured to determine the feature regions from the video frame; and input the video frame into the fourth model to obtain the feature regions.

13. The apparatus according to claim 12, wherein the processing circuitry is configured to:

determine first shape information corresponding to the first training content; and filter out the first training content with the first shape information being in a same category as second shape information of a second training content.

14. The apparatus according to claim 13, wherein the processing circuitry is configured to:

classify training contents obtained from the training set according to shape information of the training contents to obtain at least two categories of the training contents;

determine first gradient information according to the at least two categories of the training contents;

determine second gradient information according to location information of the training contents; and train parameters of the third model by minimizing the first gradient information and the second gradient information to obtain the fourth model.

15. The apparatus according to claim 11, wherein the processing circuitry is configured to:

generate a feature sequence based on a detection of the selections of the feature regions, the feature sequence being a multi-dimensional binary sequence; and generate the feature vector according to the feature sequence.

16. The apparatus according to claim 15, wherein the processing circuitry is configured to:

determine a center point of a feature region of the feature regions; and detect the selection of the feature region according to a distance between the center point and an operation trigger point.

17. The apparatus according to claim 11, wherein the processing circuitry is configured to:

determine a time series feature of the feature vector;

input the feature vector into the first model for a parameter adjustment of the first model; and input the time series feature into the first model after the parameter adjustment for training to obtain the second model.

18. The apparatus according to claim 17, wherein the processing circuitry is configured to:

segment the feature vector according to a feature extraction interval to obtain at least two feature vector sets; and extract operation sequences on the feature region in the at least two feature vector sets to obtain the time series feature.

19. The apparatus according to claim 11, wherein the interaction process of the plurality of cards is a first interaction process of the plurality of cards, the processing circuitry is configured to:

determine first level information of the first interaction process of the plurality of cards, the first level information indicating a first complexity;

determine second level information of a second interaction process of the plurality of cards, the second level information indicating a second complexity that is different from the first complexity; and determine the training set from the first interaction process of the plurality of cards and the second interaction process of the plurality of cards.

20. A non-transitory computer-readable medium storing instructions which when executed by a computer cause the computer to perform:

obtaining a training set based on an interaction process of a plurality of cards in a game, the training set comprising a plurality of video frames, and a video frame in the plurality of video frames comprising a card selection region for triggering an action during the interaction process;

determining feature regions in the card selection region of the video frame, each feature region in the feature regions including a respective card and being set with an action label, the action label indicating a game action associated with the respective feature region;

determining a feature vector based on selections of feature regions in the plurality of video frames; and inputting the feature vector into a first model for training to obtain a second model, the first model associating the feature vector with action labels of the feature regions, and the second model indicating correspondences between content of the plurality of cards and the action labels.

* * * * *